(12) United States Patent
Hino

(10) Patent No.: US 7,604,418 B2
(45) Date of Patent: Oct. 20, 2009

(54) OPTICAL COMMUNICATION MODULE AND OPTICAL COMMUNICATION MODULE HOLDER

(75) Inventor: Masato Hino, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 0 days.

(21) Appl. No.: 12/125,534

(22) Filed: May 22, 2008

(65) Prior Publication Data

US 2008/0292250 A1 Nov. 27, 2008

(30) Foreign Application Priority Data

May 23, 2007 (JP) ............................. 2007-137278
May 28, 2007 (JP) ............................. 2007-141145

(51) Int. Cl.
*G02B 6/36* (2006.01)
(52) U.S. Cl. ......................................... 385/92; 385/88
(58) Field of Classification Search ............. 385/88–92
See application file for complete search history.

(56) References Cited

U.S. PATENT DOCUMENTS 5,596,665 A * 1/1997 Kurashima et al. ............ 385/92
7,364,446 B2 * 4/2008 Kurashima ................... 439/157
7,486,524 B2 * 2/2009 Ice et al. ...................... 361/752
7,507,111 B2 * 3/2009 Togami et al. ............... 439/484
2003/0044129 A1 * 3/2003 Ahrens et al. ................. 385/92
2005/0191013 A1 9/2005 Sasaki et al.
2007/0189673 A1 * 8/2007 Yoshikawa .................... 385/53

FOREIGN PATENT DOCUMENTS

JP 2001-298239 A 10/2001
JP 2005-249892 A 9/2005

OTHER PUBLICATIONS

Notification of Reason(s) for Refusal from the Office Action issued on May 26, 2009 in corresponding Japanese Patent Application No. 2007-141145.

* cited by examiner

*Primary Examiner*—Ellen Kim
(74) *Attorney, Agent, or Firm*—Westerman, Hattori, Daniels & Adrian, LLP.

(57) ABSTRACT

An optical communication module includes a receptacle, a chassis and a pressing jig. The receptacle has a photonic device therein and a projection portion. The chassis houses the receptacle. The pressing jig has an engage portion. The engage portion is latched with the chassis with the pressing jig pressing the projection portion of the receptacle to the chassis.

9 Claims, 8 Drawing Sheets

OPTICAL COMMUNICATION MODULE AND OPTICAL COMMUNICATION MODULE HOLDER

BACKGROUND OF THE INVENTION

1. Field of the Invention

The present invention relates an optical communication module and an optical communication module holder, and in particular, relates an optical communication module and an optical communication module holder in which a receptacle for connecting a photonic device and an optical component is fixed.

2. Description of the Related Art

A communication device is modularized and is detachable from a case, in an optical communication device field demanded for miniaturization. For example, a receptacle is supposed. The receptacle houses a light-receiving component such as a photodiode and a light-emitting component such as a semiconductor laser in a chassis facing to an end face of an optical fiber, an optical signal coming into or emitting from the end face of the optical fiber, the optical signal being introduced into and derived from the receptacle through the optical fiber.

And another receptacle is supposed to house at least an optical transmitting module and an optical receiving module in a single chassis and provides one channel of an optical communication as one unit, in view of further miniaturization.

A stable connection at an optical connection portion or a shielding of unnecessary high-frequency-wave signal to outside of the module at the optical connection portion is an important problem, in order to improve a reliability of the optical communication module.

Japanese Patent Application Publication No. 2005-249892 (referred to as Document 1) discloses an optical module in which fixing jigs hold a receptacle therebetween in a vertical direction, and the fixing jigs are fixed to a chassis.

However, the receptacle is only fixed to the chassis in the fixing method disclosed in Document 1. Therefore, high-frequency-wave is leaked from a connection portion between the receptacle and an optical fiber connection portion.

And, there is a problem that an assembly operation efficiency is degraded and attach and detach are not easy because an optical fiber, an light-emitting component and light-receiving component are fixed with optical axes thereof corresponding to each other although there is a method of fixing the receptacle to a chassis with adhesive agent.

SUMMARY OF THE INVENTION

The present invention has been made in view of the above circumstances and provides an optical communication module and an optical communication module holder fixing a receptacle to a chassis stably and restraining leakage of high-frequency-wave signal.

According to an aspect of the present invention, there is provided an optical communication module including a receptacle, a chassis and a pressing jig. The receptacle has a photonic device therein and a projection portion. The chassis houses the receptacle. The pressing jig has an engage portion. The engage portion is latched with the chassis with the pressing jig pressing the projection portion of the receptacle to the chassis. With the structure, the receptacle may be fixed to the chassis easily and stably, because the engage portion of the pressing jig is latched with the chassis with the pressing jig pressing the projection portion of the receptacle to the chassis. And a leakage of high-frequency-wave signal is restrained because the projection portion of the receptacle presses the chassis.

According to another aspect of the present invention, there is provided an optical communication module holder housing a receptacle including a chassis and a pressing jig. The pressing jig has an engage portion. The pressing jig has a locking portion that is latched with the engage portion when pressing the receptacle to the chassis. With the structure, the receptacle may be fixed to the chassis easily and stably. And a leakage of high-frequency-wave signal is restrained.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention with reference to the accompanying drawings.

First Embodiment

Figure 1:
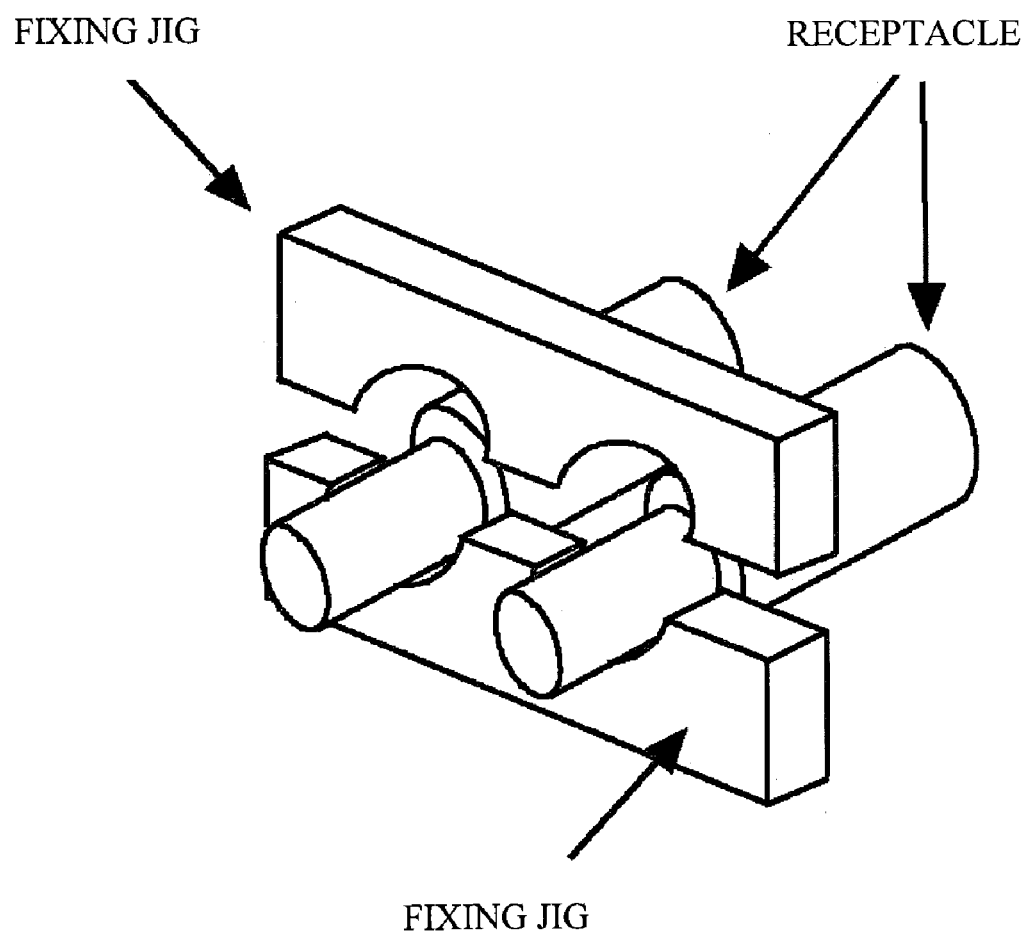
FIG. 1 illustrates a conventional fixing jig of a receptacle in accordance with an aspect of a first embodiment.
Figures 2A, 2B:
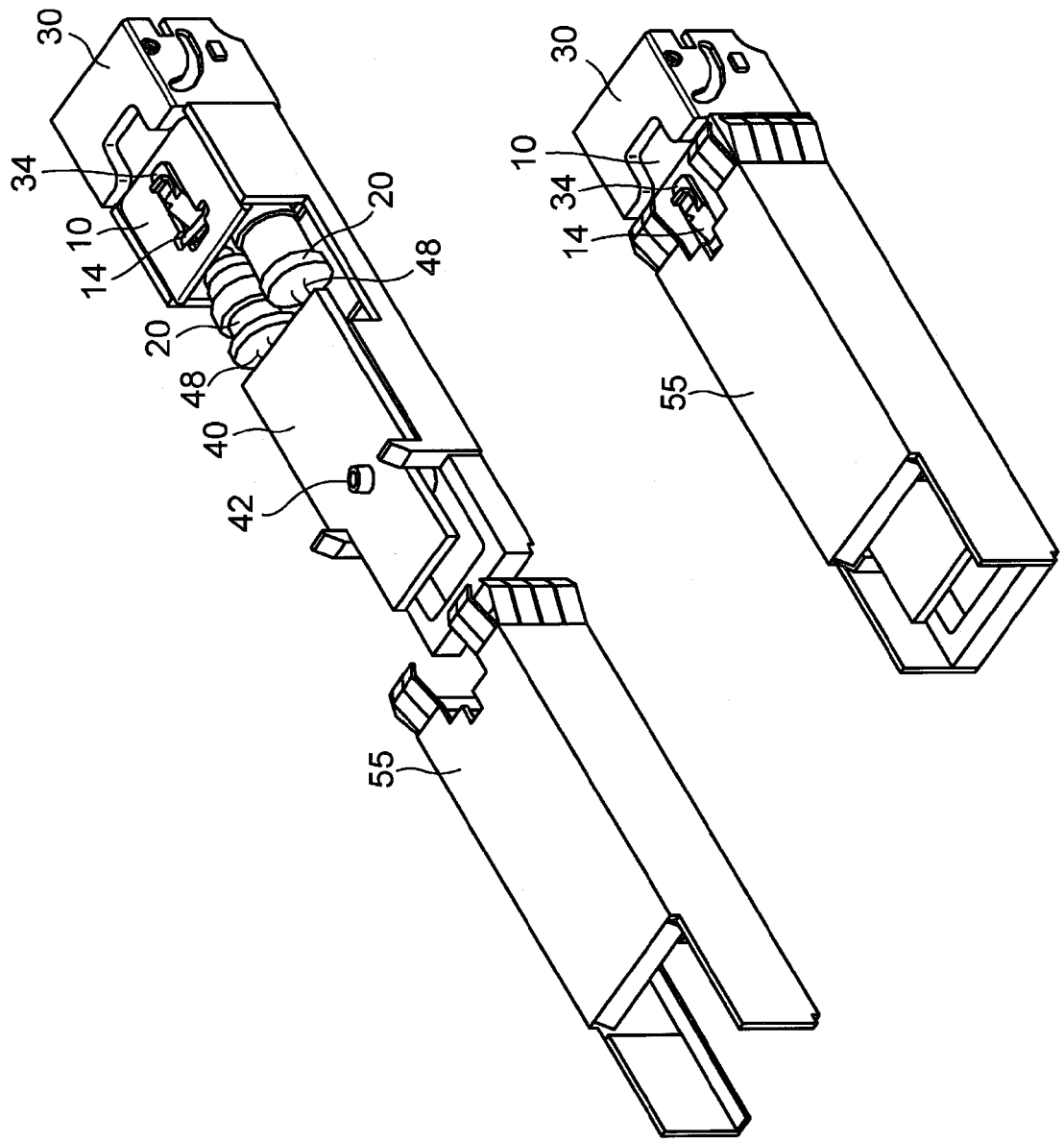
FIG. 2A and FIG. 2B illustrate a perspective view of an optical communication module in accordance with an aspect of the first embodiment.

A first embodiment shows an example of SFP+ (Small Form Factor Pluggable+) type transceiver. FIG. 2A illustrates a perspective view of an optical communication module in accordance with the first embodiment of which cover is detached from a chassis thereof. FIG. 2B illustrates a perspective view of the optical communication module of which cover is attached to the chassis. As shown in FIG. 2A, two receptacles 20 are housed in a metal chassis 30 with a jig 10 (a pressing jig). For example, the chassis 30 is made of metal material such as zinc die-casting. The receptacle 20 is made of metal material such as stainless steal. The jig 10 is made of metal such as elastic stainless steal, is made of metal such as elastic phosphor bronze, or is made of elastic plastic. An engage portion 14 (an opening for engagement) is latched with a locking portion 34 (a convex for latching) of the chassis 30. This results in a fixing of the two receptacles 20 to the chassis 30. One of the receptacles 20 has an optical transmitting unit structured with a sleeve, a ferrule housing an optical fiber, a lens and a photonic device (a light-emitting component). The other of has an optical receiving unit structured with a sleeve, a ferrule housing an optical fiber, a lens and a photonic device (a light-receiving component). A circuit substrate 40 is threadably mounted on the chassis 30 with a screw 42. A transceiver circuit (not shown) is provided below the circuit substrate 40. The transceiver circuit is a circuit for transmitting an electrical signal to an optical transmitting unit and transmitting light to an optical fiber through the optical transmitting unit and for receiving an electrical signal from an optical receiving unit receiving light from the optical fiber. There is provided a cable 48 that connects an optical component (not shown) in the receptacle 20 to the transceiver circuit and inputs and outputs an electrical signal. The cable 48 is omitted in following drawings. As shown in FIG. 2B, the receptacle 20 and the circuit substrate 40 are protected with a cover 55 when the cover 55 is fitted into the chassis 30.

Figure 3A:
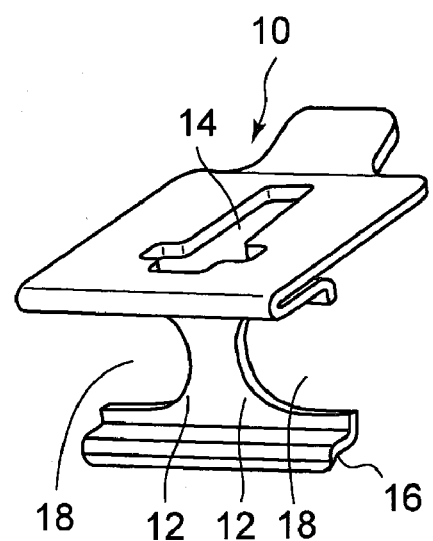
FIG. 3A through FIG. 3C illustrate a perspective view of a jig and a receptacle in accordance with an aspect of the first embodiment.
Figure 3B:
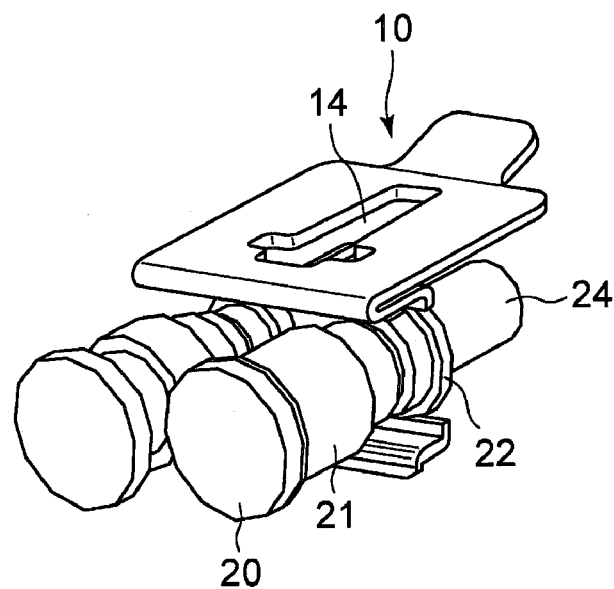
Figure 3C:
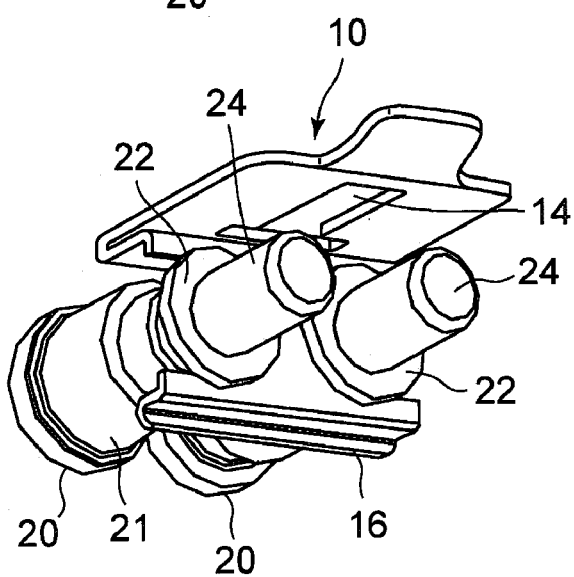

FIG. 3A illustrates a perspective view of the jig 10. The jig 10 has an opening 18, a pressing portion 12 and the engage portion 14. The receptacle 20 passes through the opening 18. The pressing portion 12 presses a projection portion 22 of the receptacle 20 to around the opening 18. The engage portion 14 is latched with the locking portion 34 of the chassis 30 when the projection portion 22 presses the chassis 30. FIG. 3B and FIG. 3C illustrate a perspective view showing a relationship between the receptacle 20 and the jig 10. The receptacle 20 has a fiber connection portion 24 to which an optical fiber is connected, the projection portion 22 with which the pressing portion 12 of the jig 10 meets, and a photonic device housing 21 housing a photonic device. A portion of the receptacle 20 between the photonic device housing 21 and the projection portion 22 is fitted into the opening 18 of the jig 10. Thus, the pressing portion 12 meets with the projection portion 22.

Figure 4:
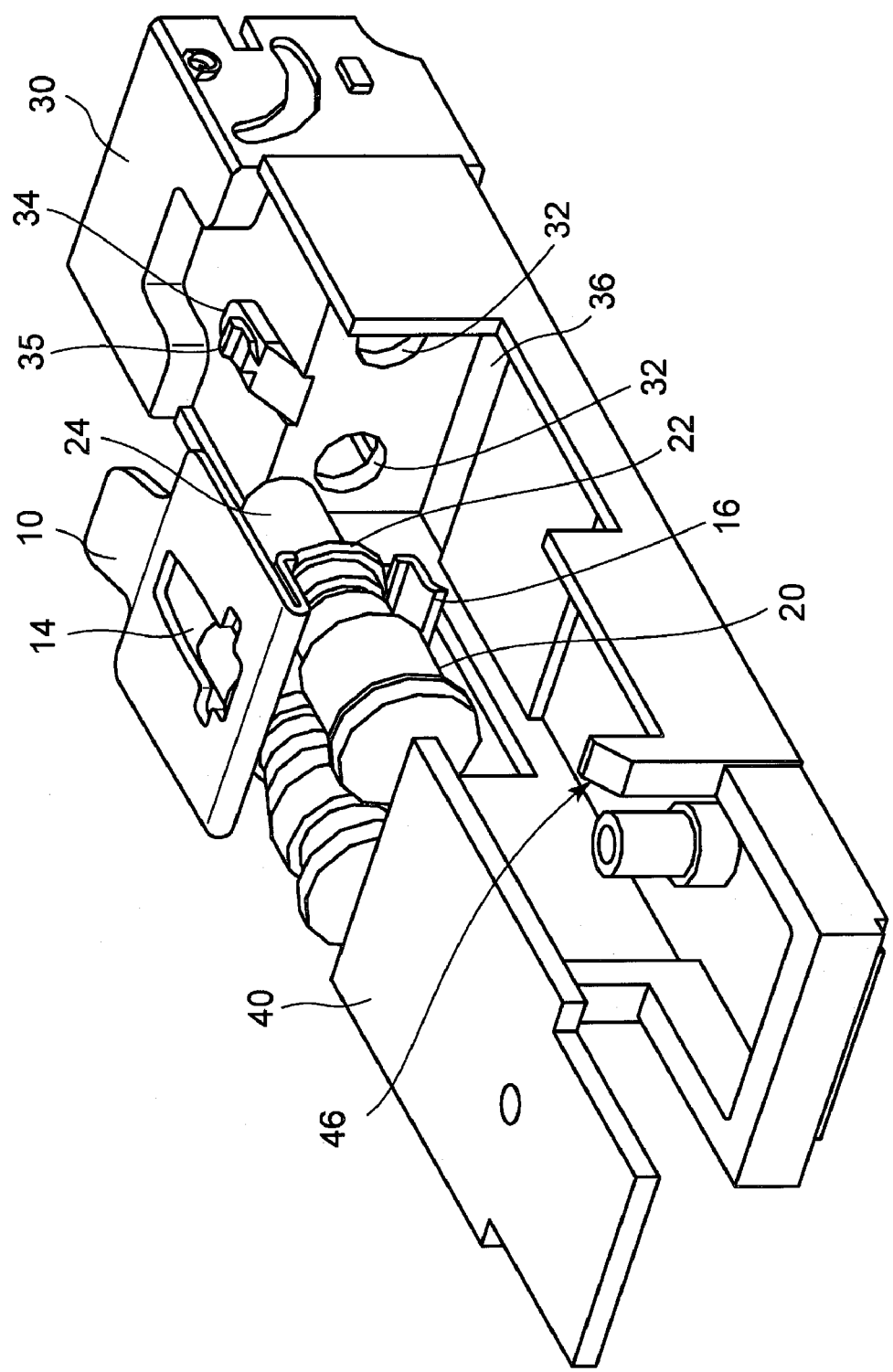
FIG. 4 illustrates an exploded perspective view of a chassis, a jig and a receptacle in accordance with an aspect of the first embodiment.

FIG. 4 illustrates an exploded perspective view of the chassis 30, the receptacle 20 and the circuit substrate 40. The fiber connection portion 24 of the receptacle 20 is inserted into a hole 32 formed in the chassis 30, and the pressing portion 12 of the jig 10 presses the projection portion 22 of the receptacle 20. Thus, the receptacle 20 is fixed to the chassis 30. The engage portion 14 is latched with the locking portion 34 of the chassis 30. In this case, a supporting portion 16 is fitted into a recess 36 of the chassis 30, and acts as a supporting point of a case where the projection portion 22 of the receptacle 20 is pressed. This results in a fixing of the jig 10 to the chassis 30. The circuit substrate 40 is housed in a circuit substrate housing 46 in the chassis 30. A projection portion 35 provided on the locking portion 34 is latched with an outer connector when an optical communication module is connected to the outer connector.

Figure 5A:
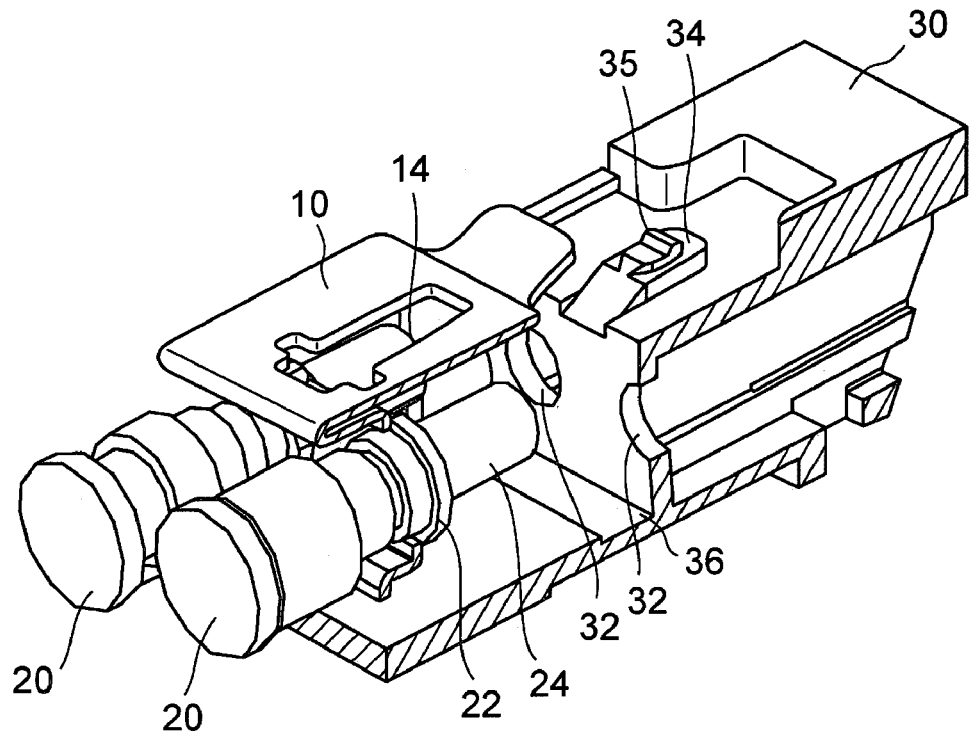
FIG. 5A and FIG. 5B illustrate a cutout perspective view of a chassis and a jig in accordance with an aspect of the first embodiment.
Figure 5B:
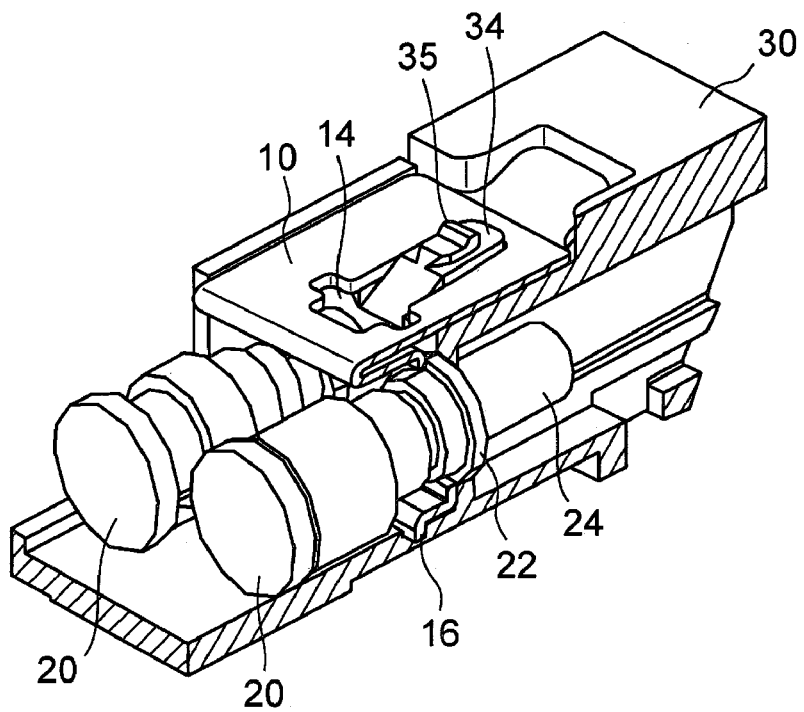
Figure 6A:
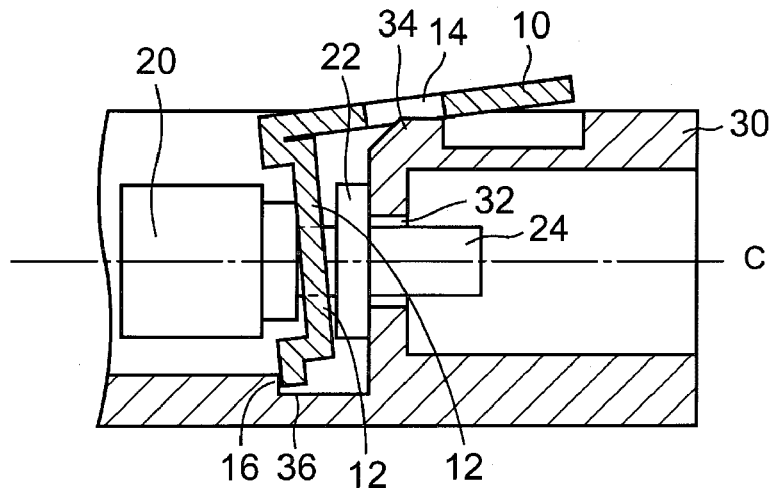
FIG. 6A through FIG. 6C illustrate a schematic cross sectional view of a chassis and a jig in accordance with an aspect of the first embodiment.
Figure 6B:
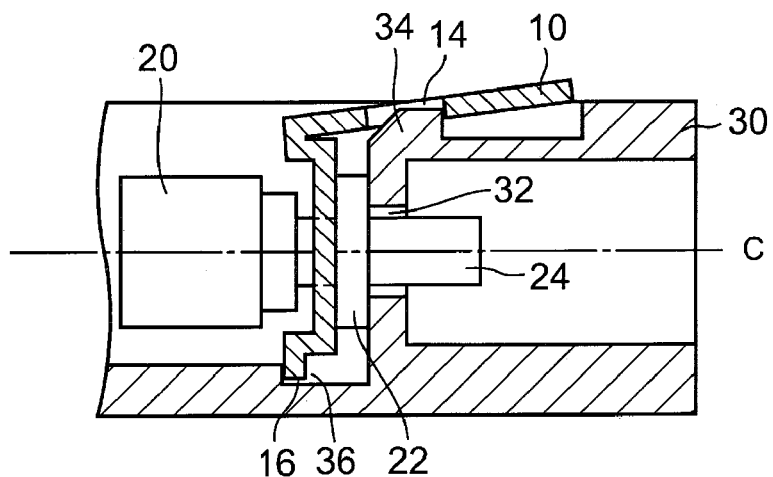
Figure 6C:
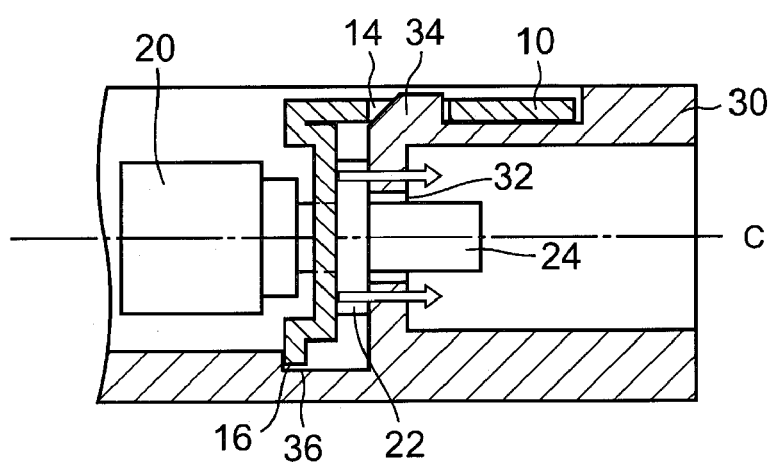

A description will be given of a fixing method of the receptacle 20 to the chassis 30 with the jig 10, with reference to FIG. 5A through FIG. 6C. FIG. 5A and FIG. 5B illustrate a cutout perspective view of the chassis 30. FIG. 6A through FIG. 6C illustrate a schematic cross sectional view of the chassis 30. As shown in FIG. 5A, the fiber connection portion 24 is inserted into the hole 32 of the chassis 30 with the receptacle 20 being arranged on the jig 10. As shown in FIG. 6A, the jig 10 is arranged so that the supporting portion 16 is fitted into the recess 36 of the chassis 30, the supporting portion 16 acting as a supporting point when the jig 10 presses the receptacle 20. As shown in FIG. 6B, the engage portion 14 of the jig 10 is latched with the locking portion 34 of the chassis 30. As shown in FIG. 5B and FIG. 6C, the pressing portion 12 presses the projection portion 22 of the receptacle 20 and the projection portion 22 is biased in an optical axis direction because the jig 10 is elastic (with reference to an arrow shown in FIG. 6C).

As shown in FIG. 6C, the receptacle 20 is inserted into the opening 18 of the jig 10 shown in FIG. 3A. The receptacle 20 is fixed to the chassis 30 when the engage portion 14 of the jig 10 is latched with the locking portion 34 of the chassis 30 and the pressing portion 12 presses the projection portion 22 toward the chassis 30, because the opening 18 is smaller than the projection portion 22. The engage portion 14 is latched with the chassis 30 toward which the jig 10 presses the projection portion 22 of the receptacle 20. It is therefore possible to attach the receptacle 20 to the chassis 30 easily with each optical axis corresponding to each other.

And it is possible to latch the engage portion 14 with the chassis 30 toward which the jig 10 presses the projection portion 22, because the jig 10 has the supporting portion 16 on one side thereof and the engage portion 14 on the other side.

The chassis 30 has the hole 32 having a diameter smaller than the flanged projection portion 22. The projection portion 22 covers the hole 32 of the chassis 30 wholly when the projection portion 22 covers the hole 32 with the pressure. It is therefore possible to restrain a leakage of outer high-frequency-wave signal into the circuit substrate housing 46 and a leakage of high-frequency-wave signal generated in the circuit substrate housing 46 to outside.

The chassis 30 and the receptacle 20 are electrically earthed to outside, when the chassis 30 and the receptacle 20 are made of conductive metal (for example, the chassis 30 is made of zinc die-casting and the receptacle 20 is made of stainless steal). It is therefore possible to restrain a leakage of outer high-frequency-wave signal into the circuit substrate housing 46 and a leakage of high-frequency-wave signal generated in the circuit substrate housing 46 to outside.

It is preferable that the chassis 30 has at least a metal portion contacting to the receptacle 20. It is preferable that a surface of the receptacle 20 and a region of the chassis 30 pressed by the receptacle 20 are electrically conductive. In this case, the part of the chassis 30 contacting to the receptacle 20 is electrically earthed to outside. It is therefore possible to restrain a leakage of outer high-frequency-wave signal into the circuit substrate housing 46 and a leakage of high-frequency-wave signal generated in the circuit substrate housing 46 to outside.

More than one receptacle 20 arranged laterally is inserted into the jig 10, and the engage portion 14 is arranged in a longitudinal direction of the receptacle 20. It is possible to reduce a width of the chassis 30 when the engage portion 14 is not arranged in an array direction of the receptacle 20 but is arranged in a direction crossing with the receptacle 20.

Second Embodiment

Figure 7A:
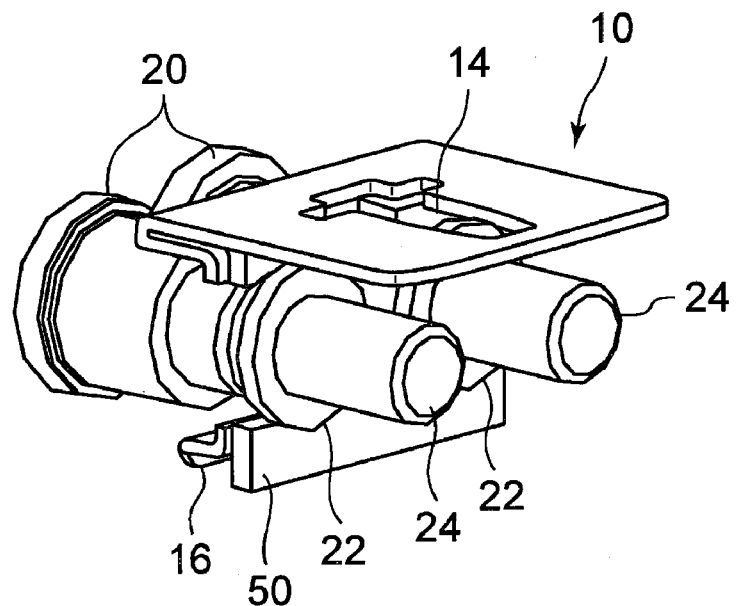
FIG. 7A and FIG. 7B illustrate an second embodiment.
Figure 7B:
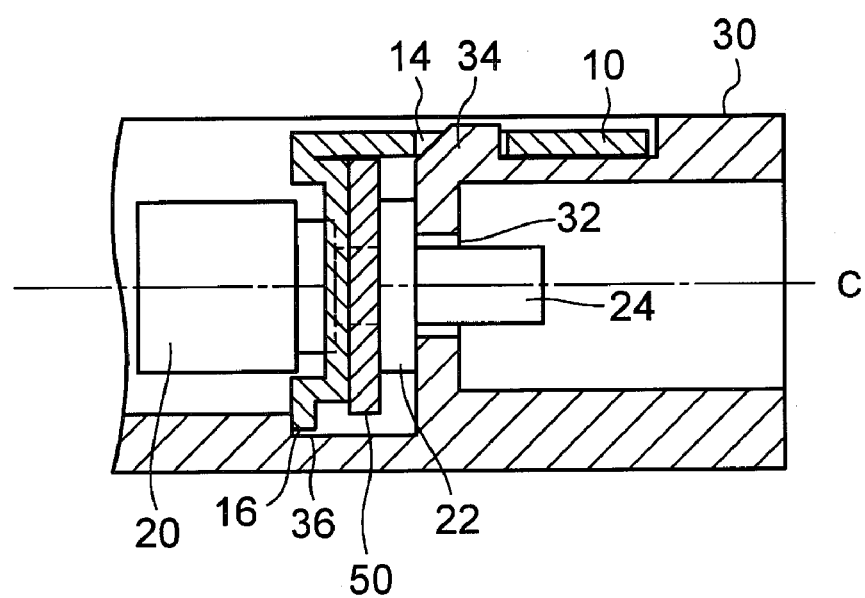

A second embodiment shows an example in which a pressing portion presses a projection portion through a spacer. FIG. 7A illustrates a perspective view of the receptacle 20 and the jig 10. FIG. 7B illustrates a schematic cross sectional view of the receptacle 20 and the jig 10. A spacer 50 made of metal is provided between the projection portion 22 of the receptacle 20 and the pressing portion 12 of the jig 10 shown in FIG. 3A. As mentioned above, the plate-shaped spacer 50 may be provided between the jig 10 and the receptacle 20. The strength of the jig 10 is reduced when the jig 10 is elastic. In the second embodiment, the strength of the jig 10 is improved when the pressing portion 12 presses the projection portion 22 through the spacer 50.

Figure 8A:
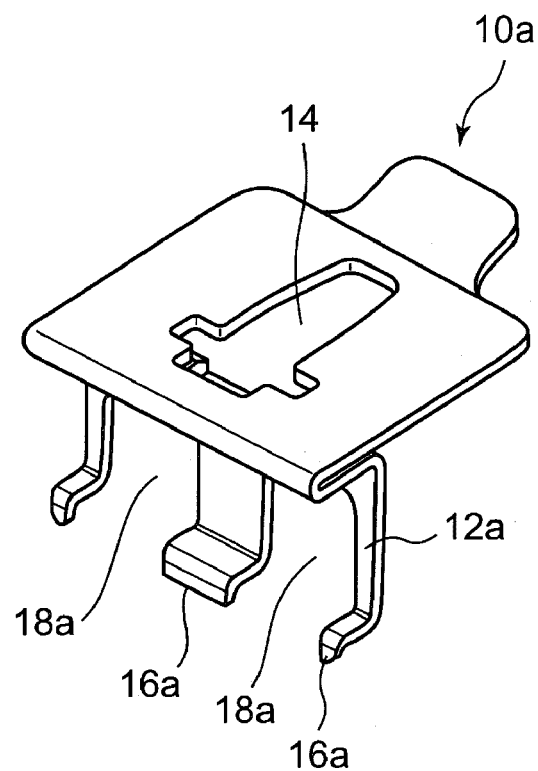
FIG. 8A and FIG. 8B illustrate another example of a jig.
Figure 8B:
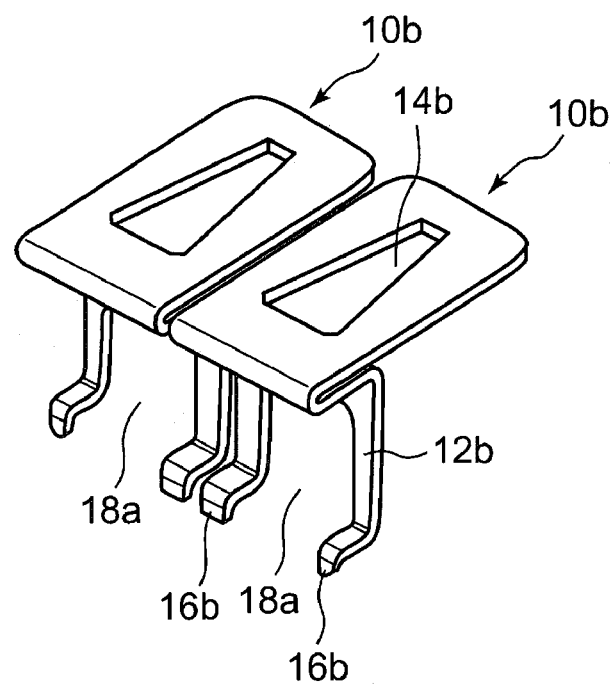

As shown in FIG. 8A, an opening 18a of a jig 10a may be opened in a longitudinal direction of the jig 10a. A plurality of the receptacles 20 may be fixed to the chassis 30 when the jig 10 or the jig 10a presses the receptacles 20, as shown in the first embodiment and FIG. 8A. As shown in FIG. 8B, the two receptacles 20 may be respectively fixed with each of two jigs 10b provided according to the receptacles 20. This results in a difference between each pressure to the receptacles 20 from each jig 10b. As mentioned above, the structure of the jig is not limited.

The present invention is not limited to the specifically disclosed embodiments, but include other embodiments and variations without departing from the scope of the present invention.

The present application is based on Japanese Patent Application Nos. 2007-137278 filed on May 23, 2007 and 2007-141145 filed on May 28, 2007, the entire disclosure of which is hereby incorporated by reference.

What is claimed is:

1. An optical communication module, comprising:
   a receptacle having a photonic device therein and a projection portion;
   a chassis for housing the receptacle; and
   a pressing jig including an engage portion and a supporting portion that is supported by the chassis while pressing the projection portion against said chassis,
   wherein the engage portion is latched to the chassis such that the pressing jig presses the projection portion of the receptacle against said chassis.

2. The optical communication module as claimed in claim 1, wherein the chassis houses a plurality of the receptacles.

3. The optical communication module as claimed in claim 2, wherein the pressing jig presses the plurality of the receptacles.

4. The optical communication module as claimed in claim 2, further comprising a plurality of the pressing jigs that are provided according to the plurality of the receptacles respectively.

5. The optical communication module as claimed in claim 1, further comprising a plate-shaped spacer between the pressing jig and the receptacle.

6. The optical communication module as claimed in claim 1, wherein a surface of the receptacle and a region of the chassis which contacts said receptacle are electrically conductive.

7. The optical communication module as claimed in claim 1,
   wherein the chassis includes a locking portion on a side thereof where the pressing jig presses; and
   wherein the engage portion is latched to said locking portion when the pressing jig is pressed.

8. An optical communication module holder housing a receptacle, comprising:
   a chassis; and
   a pressing jig including an engage portion and a supporting portion that is supported by the chassis while pressing the receptacle against said chassis,
   wherein said chassis includes a locking portion that is latched to said engage portion when pressing the receptacle to the chassis.

9. The optical communication module holder as claimed in claim 8, wherein a region of the chassis pressed by the receptacle is electrically conductive.

* * * * *